(12) United States Patent
Arntson

(10) Patent No.: US 7,016,741 B2
(45) Date of Patent: Mar. 21, 2006

(54) PROCESS CONTROL LOOP SIGNAL CONVERTER

(75) Inventor: Douglas W. Arntson, Maple Grove, MN (US)

(73) Assignee: Rosemount Inc., Eden Prairie, MN (US)

( * ) Notice: Subject to any disclaimer, the term of this patent is extended or adjusted under 35 U.S.C. 154(b) by 183 days.

(21) Appl. No.: 10/685,167

(22) Filed: Oct. 14, 2003

(65) Prior Publication Data

US 2005/0080493 A1 Apr. 14, 2005

(51) Int. Cl.
*G05B 11/01* (2006.01)
(52) U.S. Cl. .............................. 700/19; 700/9; 370/410
(58) Field of Classification Search .................... 700/1, 700/9, 11, 12, 19, 37, 282, 39, 90, 2; 370/410; 340/825, 825.01
See application file for complete search history.

(56) References Cited

U.S. PATENT DOCUMENTS

| | | | |
|---|---|---|---|
| 4,122,719 A | 10/1978 | Carlson et al. | 73/342 |
| 4,243,931 A | 1/1981 | Dela Cruz | 323/302 |
| 4,413,314 A | 11/1983 | Slater et al. | 364/188 |
| 4,678,937 A | 7/1987 | Price | 307/311 |
| 4,910,658 A | 3/1990 | Dudash et al. | 364/138 |
| 4,936,690 A | 6/1990 | Goetzinger | 374/181 |
| 5,307,346 A | 4/1994 | Fieldhouse | 370/85.1 |
| 5,495,769 A | 3/1996 | Broden et al. | 73/718 |
| 5,551,053 A | 8/1996 | Nadolski et al. | 395/829 |
| 5,706,007 A | 1/1998 | Fragnito et al. | 341/155 |
| 5,713,668 A | 2/1998 | Lunghofer et al. | 374/179 |
| 5,737,543 A | 4/1998 | Gavin et al. | 395/285 |
| 5,803,604 A * | 9/1998 | Pompei | 374/181 |
| 5,825,664 A | 10/1998 | Warrior et al. | 364/550 |
| 5,876,122 A | 3/1999 | Eryurek | 374/183 |
| 5,980,078 A | 11/1999 | Krivoshein et al. | 364/131 |
| 6,014,612 A | 1/2000 | Larson et al. | 702/183 |
| 6,016,523 A | 1/2000 | Zimmerman et al. | 710/63 |
| 6,026,352 A | 2/2000 | Burns et al. | 702/182 |
| 6,035,240 A | 3/2000 | Moorehead et al. | 700/2 |
| 6,047,222 A | 4/2000 | Burns et al. | 700/79 |
| 6,052,655 A | 4/2000 | Kobayashi et al. | 702/184 |
| 6,094,600 A | 7/2000 | Sharpe, Jr. et al. | 700/19 |
| 6,104,875 A | 8/2000 | Gallagher et al. | 395/712 |
| 6,192,281 B1 | 2/2001 | Brown et al. | 700/2 |
| 6,574,515 B1 | 6/2003 | Kirkpatrick et al. | 700/19 |
| 6,711,446 B1 | 3/2004 | Kirkpatrick et al. | 700/19 |

(Continued)

FOREIGN PATENT DOCUMENTS

DE    297 20 492 U1    3/1998

(Continued)

OTHER PUBLICATIONS

"Advanced Systems Simplify Control", *Machine Design*, Penton, Inc., vol. 68, No. 12, pp. 118, 120, Jul. 11, 1996.

(Continued)

*Primary Examiner*—Leo Picard
*Assistant Examiner*—Alexander Kosowski
(74) *Attorney, Agent, or Firm*—Westman, Champlin & Kelly, P.A.

(57) ABSTRACT

A device for use in a process control system includes a first pair of electrical connections configured to couple to a two-wire process control loop. The loop includes a two-wire process variable transmitter. A second pair of electrical connections is configured to couple to an input channel of a process device having multiple input channels. An electrical component is connected in series in the loop for use in digital communication with the two-wire process variable transmitter.

26 Claims, 4 Drawing Sheets

U.S. PATENT DOCUMENTS

2002/0010518 A1    1/2002   Reid et al. .................... 700/31
2004/0190592 A1*   9/2004   Lojen ......................... 374/172

FOREIGN PATENT DOCUMENTS

| EP | 0 601 344 A1 | 5/1994 |
| EP | 0 666 631 A2 | 1/1995 |
| GB | 2 329 039 A | 3/1999 |
| JP | 52-108194 | 9/1977 |
| JP | 07162345 A | 6/1995 |

OTHER PUBLICATIONS

"PLCs: Looking Around for More Work to Do", by M. Bab, *Control Engineering*, pp. 59, 60 and 62, Oct. 1996.

"D5000 Series Users Manual", 23 pages, Revised Jan. 1, 1998.

"Model 848T Eight Input Temperature Transmitter With FOUNDATION™ Fieldbus", *Product Data Sheet 00813-0100-4697*, Mar. 2003.

"ACE pc," Arcom Control Systems, 1 page dated Feb. 23, 2000, downloaded from http://www.arcom.co.uk/products/iep/systems/ace/default.htm.

"Smart Transmitter (HART Protocol) Interface Products," 1770 Communication Products, 2 pages dated Apr. 26, 1999, downloaded from http://www.ab.com/catalogs/html/b112/io/smart.html.

"Smart Head and Rail Mount Temperature Transmitters," Models 644H and 644R, FISHER-ROSEMOUNT Managing the Process Better, pp. 37-52 (1998).

"Smart Temperature Transmitter," Models 3144 and 3244MV, FISHER-ROSEMOUNT Managing the Process. Better, pp. 19-36 (1998).

"Transducer Interfacing Handbook," A Guide to Analog Signal Conditioning, by Daniel H. Sheingold, 5 pages (1980).

Instruction Manual FD0-BI-Ex12.PA, German language document, and apparent English equivalent Part No.: 107591, Jan. 24, 2001.

Universal temperature multiplexer for Foundation Fieldbus, Universal converter, analogue, F2D0-TI-Ex8.FF, 2003.

Valve Coupler for Foundation Fieldbus, Manual FD0-VC-Ex4.FF, Nov. 22, 2000.

PROFIBUS-PA Valve Coupler Filed Box, 2002 IS Catalog, 2002.

PROFIBUS-PA Sensor Interface Field Box, 2002 IS Catalog, 2002.

EC-Type Examination Certificate for FD0-VC-Ex4.Pa dated Dec. 18, 1998 (German Language document and apparent English translation).

Supplement to EC-Type Examination Certificate for FD0-VC-Ex.Pa dated Sep. 18, 2000 (German Language document and apparent English translation).

Supplement to EC-Type Examination Certificate for FD0-VC-Ex4.Pa dated Sep. 21, 2000 (German Language document and apparent English translation).

1st Amendment to EC-Type Examination Certificate for FD0-VC-Ex4.Pa dated Dec. 22, 1999 (German Language document and apparent English translation).

Office Action from the Chinese Patent Office in related Chinese application.

Observations by Third Party filed in related European Application including Translation.

* cited by examiner

PROCESS CONTROL LOOP SIGNAL CONVERTER

BACKGROUND OF THE INVENTION

The present invention relates to process devices. More specifically, the present invention relates to field-mounted process control and measurement devices.

Process devices are used to measure and control industrial processes such as the refining of petrochemicals, the processing of food, the generation of electric power, and a number of other processes. Process measurement devices include process variable transmitters, which measure a process variable such as pressure or temperature and communicate the measured variable to a process controller. Another type of process device is an actuator, such as a valve controller or the like. Generally, process control is accomplished using a combination of transmitters, actuators, and a process controller that communicate across a process control loop to a controller. Both types of process devices interact with the physical process through process interface elements. Process interface elements are devices which relate electrical signals to physical process conditions, and include devices such as sensors, limit switches, valve controllers, heaters, motor controllers, and a number of other devices.

The process controller is typically a microcomputer located in a control room away from the process. The process controller can receive process information from one or more process measurement devices and apply a suitable control signal to one or more process control devices to influence the process and thereby control it.

In order to couple to the process, transmitters and actuators are generally mounted near the process in the field. Such physical proximity can subject the process devices to an array of environmental challenges. For example, process devices are often subjected to temperature extremes, vibration, corrosive and/or flammable environments, and electrical noise.

In order to withstand such conditions, process devices are designed specifically for "field-mounting." Such field-mounted devices utilize robust enclosures, which can be designed to be explosion-proof. Further, field-mounted process devices can also be designed with circuitry that is said to be "intrinsically safe", which means that even under fault conditions, the circuitry will generally not contain enough electrical energy to generate a spark or a surface temperature that can cause an explosion in the presence of an hazardous atmosphere. Further still, electrical isolation techniques are usually employed to reduce the effects of electrical noise. These are just a few examples of design considerations, which distinguish field-mounted process devices from other devices, which measure sensor characteristics and provide data indicative of such characteristics.

Aside from the environmental considerations listed above, another challenge for field-mounted devices is that of wiring. Since process devices are located near the process far from the control room, long wire runs are often required to couple such devices to the control room. These long runs are costly to install and difficult to maintain.

One way to reduce the requisite wiring is by using two-wire process devices. These devices couple to the control room using a two-wire process control loop. Two-wire devices receive power from the process control loop, and communicate over the process control loop in a manner that is generally unaffected by the provision of power to the process device. Techniques for communicating over two-wires include 4–20 mA signaling, the Highway Addressable Remote Transducer (HART®) Protocol, FOUNDATION™ Fieldbus, Profibus-PA and others. Although two-wire process control systems provide wiring simplification, such systems provide a limited amount of electrical power to connected devices. For example, a device that communicates in accordance with 4–20, mA signaling must draw no more than 4 mA otherwise the device's current consumption would affect the process variable. The frugal power budget of two-wire process devices has traditionally limited the functionality that could be provided.

Another way the process control industry has reduced field wiring is by providing transmitters with two sensor inputs. Such transmitters reduce the number of transmitters/sensor and thereby reduce wiring costs as well as overall system costs. One example of such a transmitter is the Model 3244MV Multivariable Temperature Transmitter, available from Rosemount Inc., of Eden Prairie, Minn.

Although current multivariable transmitters can reduce wiring costs as well as overall system costs, they have traditionally been limited to applications involving two sensors. Thus, in applications with sixteen sensors, for example, eight multivariable transmitters would still be required. Further, if different sensor groups are independently grounded, there is a possibility that ground loop errors could occur and adversely affect process measurement.

Current methods used to overcome the problem of coupling a large number of sensors to the control room include coupling the sensors directly to the control room. For example, if a situation requires a large number of temperature sensors, consumers generally create "direct run" thermocouple configurations where thermocouple wire spans the distance between the measurement "point" and the control room. These direct run configurations are generally less expensive than the cost of obtaining a number of single or dual sensor transmitters, however, a significant wiring effort is required, and process measurement is rendered more susceptible to electrical noise due to the long runs.

The process control industry has also reduced the effects of long wire runs on process control by providing field-mounted devices that are capable of performing control functions. Thus, some aspects of process control are transferred into the field, thereby providing quicker response time, less reliance upon the main process controller, and greater flexibility. Further information regarding such control functions in a field-mounted device can be found in U.S. Pat. No. 5,825,664 to Warrior et al, entitled FIELD-MOUNTED CONTROL UNIT.

Although multivariable transmitters and process devices implementing control functions have advanced the art of process control, there is still a need to accommodate applications requiring a relatively large number of sensors, as well as applications requiring enhanced control in the field. One two-wire field mountable process device having multiple channels for coupling to a process interface element is shown and described in U.S. Pat. No. 6,574,515 entitled TWO-WIRE FIELD-MOUNTED PROCESS DEVICE by William R. Kirkpatrick et al. which issued on Jun. 3, 2003 to Rosemount Inc. of Eden Prairie Minn. and is incorporated herein in its entirety.

SUMMARY OF THE INVENTION

A device for use in a process control system includes a first pair of electrical connections configured to couple to a two-wire process control loop which includes a two-wire process variable transmitter. A second pair of electrical connections is configured to couple to an input channel of a process device having multiple input channels. An electrical component is connected in series between a first electrical connection of the first pair of electrical connections and a first electrical connection of the second pair of electrical connections. The component is used for digital communication with the two-wire process variable transmitter.

DETAILED DESCRIPTION OF THE PREFERRED EMBODIMENTS

Figure 1:
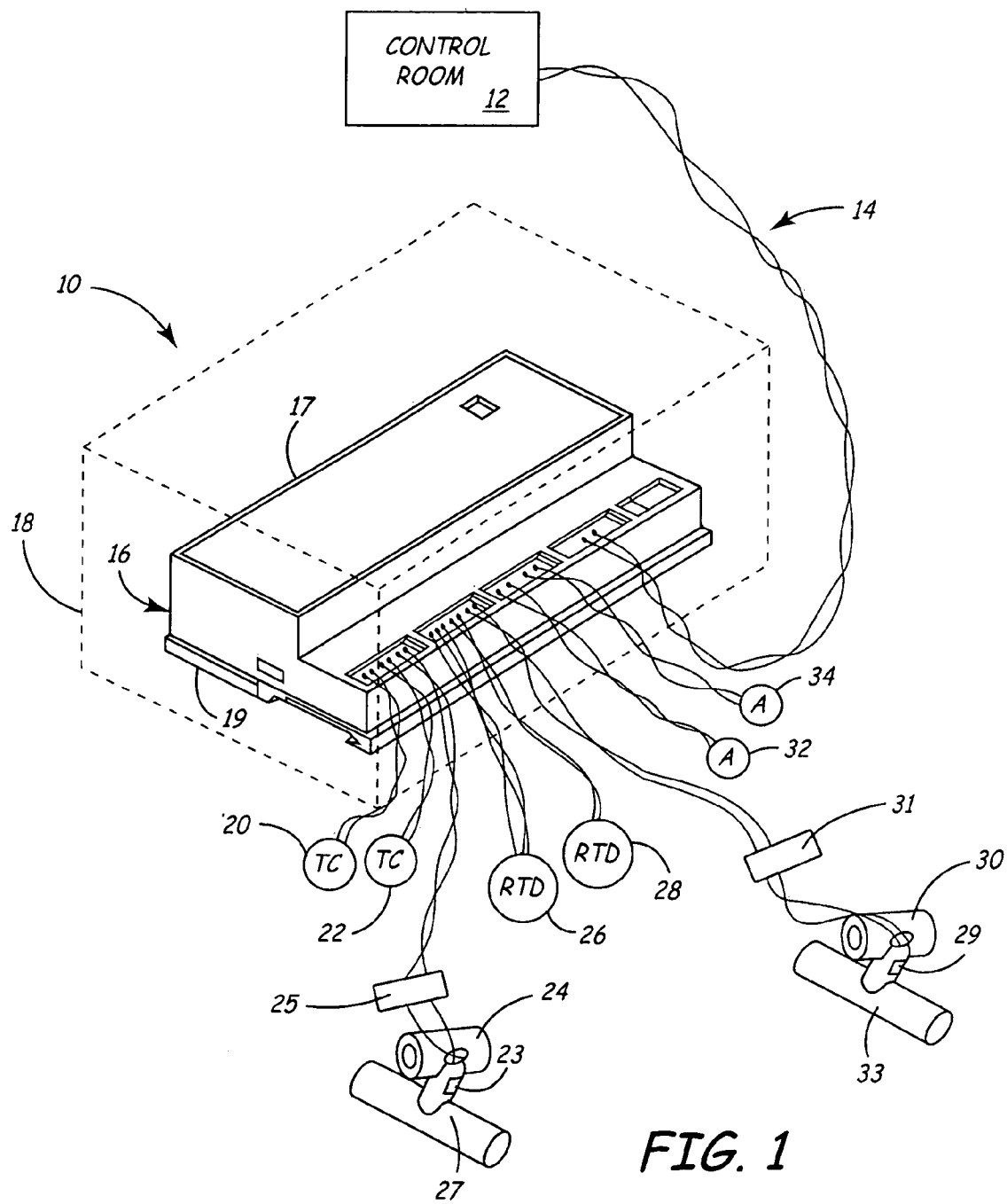
FIG. 1 is a diagrammatic view of a process control system employing a two-wire field mounted process device.

FIG. 1 is a diagrammatic view of process control system 10 which includes control room 12, process control loop 14 and process device 16. Process control system can comprise a single process device coupled to control room 12, however system 10 can also include hundreds of process devices coupled to one or more control rooms over a number of process control loops.

The present invention provides a method, apparatus and system in which a process variable transmitter is coupled to a two-wire process device which communicates with the control room 12. FIG. 1 is a diagram showing a field mountable process device 16 coupled to process variable transmitters 24 and 30 through signal conversion devices 25 and 31, respectively. Operation of signal conversion devices 25 and 31 is described below in greater detail.

Control room 12 is typically a facility located away from device 16 that includes a microcomputer. A user stationed in control room 12 uses the microcomputer to interact with various process devices through process control loop 14 and thus controls the process(es) from the control room. For clarity, control room 12 is illustrated as a single block. However, in some control system embodiments, control room 12 may in fact couple process control loop 14 to a global computer network, such as the internet, so that users worldwide could access process device 16 from traditional web browser software.

Loop 14 is a two-wire process control loop. A number of two-wire process communication protocols exist for communicating on loop 14, and any suitable protocol can be used. For example, the HART® protocol, the FOUNDATION™ Fieldbus protocol, and the Profibus-PA protocol can be used with embodiments of the present invention. Loop 14 provides power to connected process devices while providing communication between the various devices.

In this embodiment, process device 16 includes cover 17 and base 19 which are preferably constructed from a suitable plastic material. Device 16 is preferably adapted to operate solely upon electrical power received through loop 14, and is adapted for field-mounting. The process device embodiment shown in FIG. 1 has a number of inputs and outputs, and includes suitable computing circuitry (shown in FIG. 2) to execute a user generated control algorithm. The algorithm is comprised of a number of logic statements relating specific input events to outputs controlled by device 16. The user can change the algorithm either by interfacing locally with device 16, or by communicating with device 16 over control loop 14. The algorithm can be generated using conventional logic generation software such as Relay Ladder Logic and Sequential Function Charts (SFC's). In this sense, device 16 can be considered a two-wire field-mountable programmable logic controller. Although the description will focus upon the embodiment shown in FIGS. 1 and 2, such description is provided for clarity, since embodiments employing solely inputs, or outputs are expressly contemplated. Traditionally devices with the computational power of device 16 could not be operated upon two-wire process control loops due to prohibitive power constraints.

In this embodiment, process device 16 is coupled to sensors 20, 22, 26 and 28, process control transmitters 24 and 30, actuators 32 and 34. Sensors 20 and 22 are thermocouples, of known type, which are coupled to various process points to provide voltage signals based upon process variables at the respective process points. Resistance Temperature Devices (RTD's) 26 and 28 are also coupled to various process points and provide a resistance that is based upon process temperature at the respective process points. RTD 26 is coupled to device 16 through a known three-wire connection and illustrates that various wiring configurations can be used with embodiments of the present invention. Actuators 32 and 34 are coupled to process device 16 and actuate suitable valves, switches and the like based upon control signals from device 16. As noted above, device 16 can execute a user generated control algorithm to relate specific input conditions to specific output commands. For example, device 16 may sense a process fluid temperature, and cause actuator 32 to engage a heater coupled to the process fluid in order to maintain the fluid temperature at a selected level.

Process variable transmitters 24 and 30 are coupled to device 16 through signal translation devices 25 and 31. Transmitters 24 and 30 are configured to sense process variables using sensors 23 and 29, respectively, which couple to process fluid carried in process piping 27 and 33, respectively. Operation of transmitters 24 and 30 and signal translation devices 25 and 31 is described below in greater detail.

Figure 2:
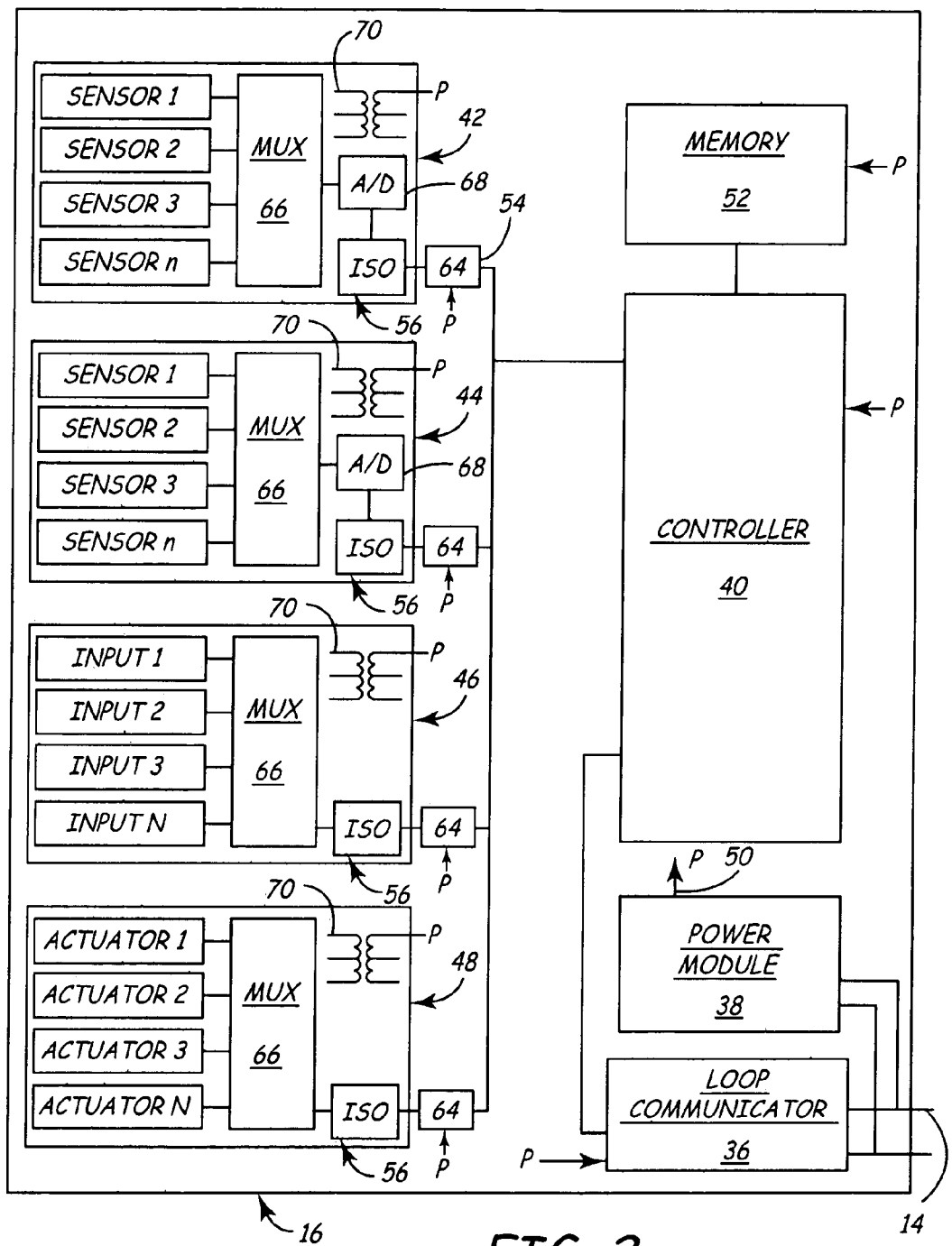
FIG. 2 is a system block diagram of the process device shown in FIG. 1.

FIG. 2 is a system block diagram of device 16 shown in FIG. 1. Device 16 includes loop communicator 36, power module 38, controller 40, and channels 42, 44, 46, 48, and memory 52. Loop communicator 36 is coupled to process control loop 14 and is adapted for bi-directional data communication over loop 14. Loop communicator 36 can include a known communication device such as a traditional FOUNDATION™ Fieldbus communication controller or the like. Additionally, communicator 36 can include suitable isolation circuitry to facilitate compliance with the intrinsic safety specification as set forth in the Factory Mutual Approval Standard entitled "Intrinsically Safe Apparatus and Associated Apparatus for Use in Class I, II, and III, Division 1 Hazardous (Classified) Locations," Class Number 3610, published October 1988.

Power module 38 is coupled to loop 14 such that power module 38 provides power to all components of device 16 based upon power received from loop 14. Although power module 38 has a single arrow 50 indicating that power module 38 provides power to all components, it is noted that such power can be provided at multiple voltages. For example, power module 38 preferably includes a switching power supply that provides electrical power at a plurality of voltages. Thus, some components such as the A/D converters and the isolators can receive a higher voltage such as 4.9 volts, while low-power components such the controller 40, memory 52 and loop communicator 36 receive a lower voltage such as 3.0 volts. Additionally, power module 38 is preferably programmable to such an extent that at least one of the voltages provided can be varied. The selectable nature of power module 38 facilitates power management, which will be described later in the specification.

In one embodiment, controller 40 is coupled to memory 52 and executes program instructions stored therein. Memory 52 is preferably low-power memory operating on 3.0 volts, such as the model LRS1331, available from Sharp Electronics. Additionally, memory 52 can be "stacked" memory in which both flash memory and volatile memory are provided on a single memory module. The user generated control algorithm, or "program" executed by controller 40 can be changed by a user either by coupling to device 16 locally, or by accessing device 16 through loop 14. In some embodiments the program includes instructions that relate process event inputs to outputs determined by controller 40. In this sense, device 16 functions similarly to a programmable logic controller, which is a device that typically has not been robust enough for field-mounting, nor able to operate on the low power levels of two-wire field devices. However, by so providing the functions of a programmable logic controller, much more sophisticated process control algorithms can be implemented through a user friendly interface, such as Relay Ladder Logic or the like.

Controller 40 receives power from module 38, and communicates with loop communicator 36. Controller 40 preferably includes a low-power microprocessor such as the model MMC 2075 microprocessor available from Motorola Inc. of Schaumburg, Ill. Additionally, controller 40 preferably has a selectable internal clock rate such that the clock rate of controller 40, and thus the computing speed and power consumption, can be selected through suitable commands sent to device 16 over loop 14. Since higher clock speeds will cause controller 40 to draw more power, clock selection of controller 40, and selection of the voltage level provided by power module 38 to controller 40 are preferably performed in tandem. In this manner the processing speed and power consumption of device 16 are selectable and vary together.

Controller 40 is coupled to the various channels through interface bus 54, which is preferably a serial bus designed for high speed data communication such as a Synchronous Peripheral Interface (SPI). Channels 42, 44, 46 and 48 are coupled to bus 54 through communication isolators 56, 58, 60 and 62, respectively, which are preferably known optoisolators, but which can be any suitable isolation devices such as transformers or capacitors. In some embodiments, channels 42, 44, 46 and 48 provide data in parallel form, and parallel-serial converters 64 are used to translate the data between serial and parallel forms. Preferably, converters 64 are Universal Asynchronous Receiver/Transmitters (UART's).

In this embodiment, channel 42 is coupled to controller 40, and includes sensor terminals 1-n, multiplexer (MUX) 66, analog-to-digital (A/D) converter 68, communication isolator 56, and power isolator 70. It is contemplated that communication isolator 56 and power isolator 70 can be combined in a single circuit. Channel 42 is specifically adapted to measure a specific sensor type such as thermocouples, resistance temperature devices, strain gauges, pressure sensors, transmitters, or other sensor type. Each sensor terminal is adapted to couple a single sensor, such as a thermocouple, to multiplexer 66. Multiplexer 66 selectively couples one of the sensors to A/D converter 68 such that a characteristic of the sensor (voltage for a thermocouple) is measured and communicated to controller 40 through isolator 56 and UART 64. Power for channel 42 is received from power module 38 through power isolator 70. Power isolator 70 is preferably a transformer, but can be any suitable device. Those skilled in the art will appreciate that communication isolator 56 and power isolator 70 cooperate to ensure that channel 42 is electrically isolated from the rest of device 16.

Channel 48 is similar to channel 42, but essentially operates in reverse compared to channel 46. Thus, serial information sent to channel 48 through the UART is converted into parallel form, and conveyed across communication isolator 56 to set individual actuator outputs. Thus, logic signals are sent to the terminals labeled ACTUATOR 1-n to cause actuators coupled to such terminals (not shown) to engage or disengage as desired. Such actuators can be any suitable device such as valve controllers, heaters, motor controllers and any other suitable device. Essentially, any device that is addressable based upon a logic type output is an actuator.

As discussed above, in some instances it is desirable to connect a process variable transmitter, such as transmitters 24 or 30, to inputs of device 16. The inputs of device 16 are configured to receive a voltage input, for example, an input which ranges between 20 and 100 mVolts DC. However, the output of a process variable transmitter is typically in accordance with a different standard, for example a 4–20 mA standard in which a process variable is represented by an electrical current in a process control loop. A 4 mA signal can represent a low value of the process variable while a 20 mA signal can represent a high value of the process variable, or other conditions such as an alarm condition.

Figure 3:
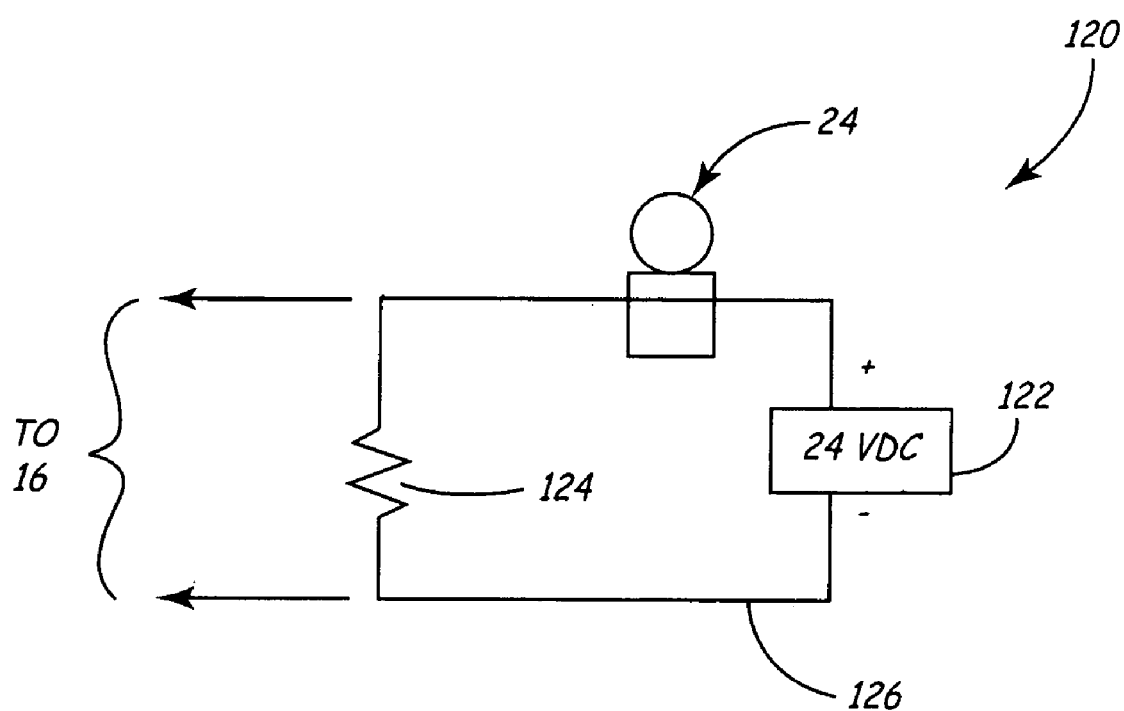
FIG. 3 is a diagram of electrical circuitry for coupling to inputs of the device of FIG. 1.

FIG. 3 is a diagram of electrical circuitry 120 for use in coupling process variable transmitter 24 to inputs of device 16. The process variable transmitter 24 is connected in series with a DC source 122 and a resistor 124 or other impedance to form a process control loop 126. The values of source 122 and resistor 124 can be chosen as appropriate, for example 24 volts and 5 ohms, respectively. In this configuration, the appropriate voltage level will appear across resistor 124, for example ranging between 20 mVolts and 100 mVolts, as the current level through loop 126 is controlled by transmitter 24. This voltage is applied to inputs of device 16 as discussed above. The power supply 122 provides the power for operation of transmitter 24 and process control loop 126.

One problem with the circuitry 120 shown in FIG. 3 occurs when digital communication is attempted with transmitter 24. For example, in accordance with the HART® standard, a digital signal can be superimposed on the DC current in the process control loop 126. The digital signal can be used to transmit data to transmitter 24 or receive data from transmitter 24. However, the elements in circuitry 126 do not provide a sufficiently large impedance for typical digital communication devices used in the process control industry to communicate with transmitter 24. For example, some digital communication devices used with process control loops require a connection across an electrical component having an impedance of between about 230 and about 600 ohms.

Figure 4:
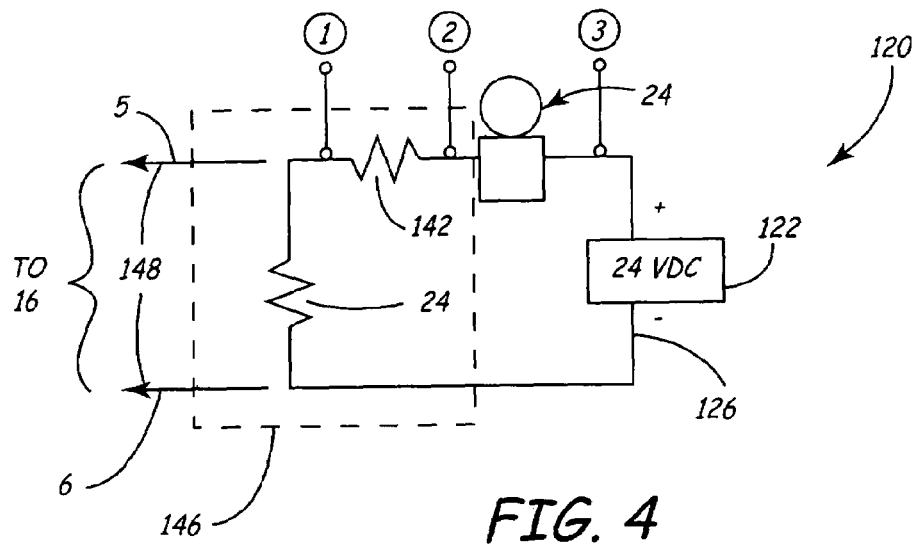
FIG. 4 is a schematic diagram of electrical circuitry for coupling to the process device of FIG. 1.

FIG. 4 is a schematic diagram of one embodiment of electrical circuitry 140 similar to the circuitry 120 shown in FIG. 3 which includes a series resistance 142 coupled in series between transmitter 24 and resistor 124. This series resistance 142 can be of about 250 ohms and can be used to provide sufficient voltage drop for digital communication with transmitter 24. For example, resistor 142 can comprise a resistor of between about 230 ohms and 600 ohms. For example, HART® communication requires between about 230 and 600 ohms of impedance. A HART® communication unit can be coupled across resistor 142 or transmitter 24, for example, and used for digital communication with transmitter 24. More specifically, a digital communicator can be coupled across terminals 1 and 2 across terminals 2 and 3 as shown in FIG. 4. This configuration provides a device 146 for use in a process control system which is used to couple the transmitter 24 on two-wire process control loop 126 to an input channel of a process device having multiple input channels. One example process device is process device 16 discussed above. More specifically, a first pair of electrical connections is configured to couple to the two-wire process control loop 126 which includes the two-wire process variable transmitter 24. The first pair of electrical connections can comprise any two of the terminals 1, 2 and 3 shown in FIG. 4. A second pair of terminals 148 provided by terminals 5 and 6 is configured to couple to an input of the process device 16. At least one electrical component is connected in series between one of the connections of the first or second pair of electrical connections and is configured for use in digital communication with the two-wire process variable transmitter 24. In the specific example shown in FIG. 4, the electrical component comprises a resistance, such as resistance 142. However, any individual electrical component or group of electrical components can be used. The component can be active or passive and can have any electrical characteristic selected as desired.

Figure 5:
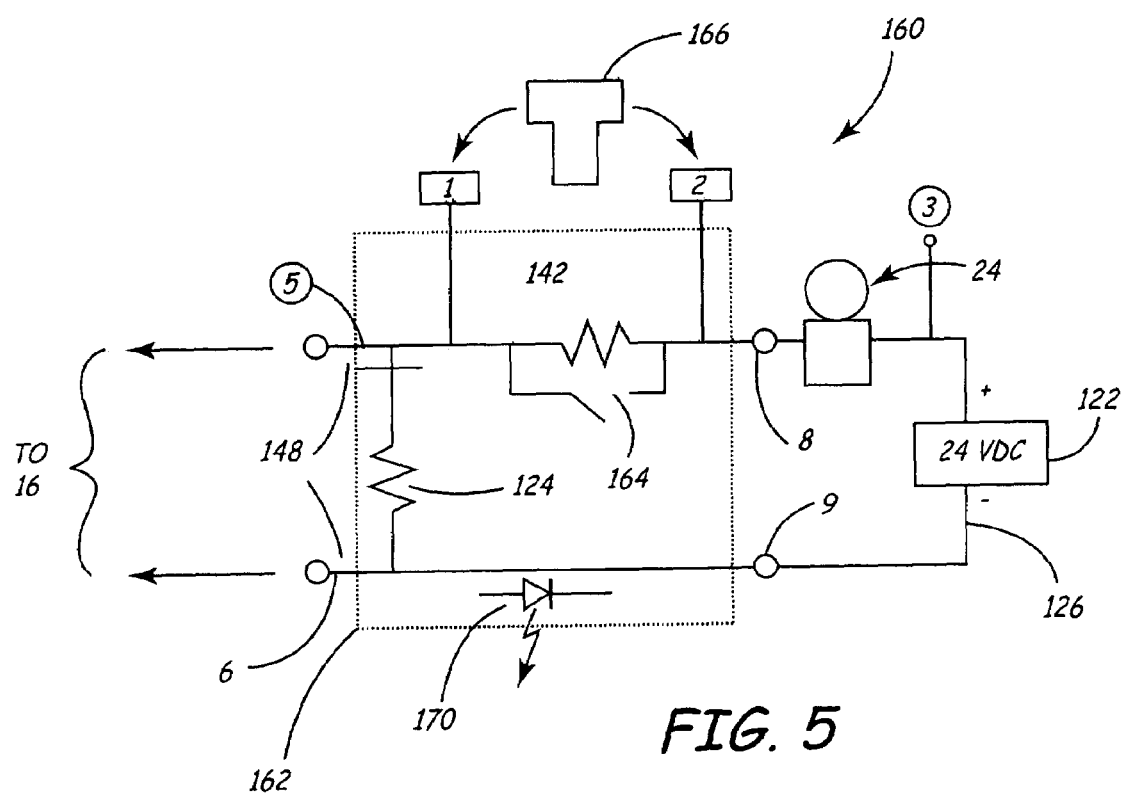
FIG. 5 is a schematic diagram of electrical circuitry for coupling to the process device of FIG. 1.

FIG. 5 is a simplified diagram of electrical circuitry 160 which includes a process device 162 in accordance with another example embodiment of the present invention. Process device 162 shown in FIG. 5 is similar to process device 146 shown in FIG. 4. Device 162 includes a switch 164 connected in parallel with resistor 142. When switch 164 is closed, resistor 142 is electrically short circuited and is effectively removed from the series connection with process control loop 126. Additionally, electrical circuitry 160 shows connections 8 and 9 configured to couple device 162 to process control loop 126. The circuitry 162 operates in a manner similar to that discussed above with regard to FIGS. 3 and 4 and allows the process transmitter 24 to be connected to an input of process device 16. Further, the device 162 is configured to allow a digital communicator 166 to be coupled to process control loop 126 for communication with transmitter 24. The communication device 166 can comprise, for example, a hand-held communicator such as a Rosemount 275 hand-held communicator. Switch 164 can be selectively closed when device 162 is used in configurations which do not require digital communication with transmitter 24. Alternatively, switch 164 can be closed when device 162 is used in configuration in which an alternative impedance is provided across other components which are not shown in FIG. 5 in process control loop 26. For example, the impedance provided by such other elements can be used for the digital communication with transmitter 24. The particular configuration and components shown for device 162 can be configured as desired. The device 162 can be used for connection of a transmitter 24 of the type which communicates through a current base process control loop with a process device which requires a voltage base input. In another example, an indicator such as an LED 170 provided in device 162 and used to indicate that the power supply 122 is active on loop 126. The power supply 122 can be an integral component of process device 162 if desired.

The process device 162 can couple to any type of process variable transmitter of the type used to sense a process variable. The device 162 allows for digital communication with the process variable transmitter 24 such that digital data can be received from transmitter 24 or sent to transmitter 24. This allows the transmitter 24 to be configured or otherwise monitored using appropriate process devices such as a hand-held communicator.

Although the present invention has been described with reference to preferred embodiments, workers skilled in the art will recognize that changes may be made in form and detail without departing from the spirit and scope of the invention. Although the electrical component is illustrated as a resistor coupling between the electrical connections, digital communications can also be provided by placing the component on the other side (the negative side) of the loop. Similarly, it is within the scope of the present invention to place the electrical component in other configurations. Although a 24 volt power supply is illustrated, the actual supply voltage can be selected as desired, for example, between about 10 volts DC and about 50 volts DC.

What is claimed is:

1. A signal conversion device for use in a process control system, comprising:
    a first pair of electrical connections configured to couple to a two-wire process control current loop which includes a two-wire process variable transmitter which provides an analog current level on the two-wire process control current loop related to a sensed process variable;
    a second pair of electrical connections configured to couple to an analog voltage input channel of a process device; and
    a first electrical component electrically connected to a first electrical connection of the first pair of electrical connections and a first electrical connection of the second pair of electrical connections, the first electrical component further configured to couple to a digital communicator to provide a connection for digital communication between the digital communicator and the two-wire process variable transmitter;
    a second electrical component connected between the first and a second electrical connection of the second pair of electrical connections to provide a connection for communication with the voltage input channel of the process device with an analog voltage related to the analog current level on the two-wire process control loop; and
    a switch connected in parallel with the first electrical component between the first electrical connector of the first pair of electrical connections and the first electrical connector of the second pair of electrical connectors, the switch configured to selectively allow digital communication by the digital communicator through the first electrical component with the two-wire process variable transmitter.

2. The apparatus of claim 1 wherein the first electrical component is in series between the first electrical connection of the first pair of electrical connections and a first electrical connection.

3. The apparatus of claim 1 wherein the first electrical component comprises a resistor.

4. The apparatus of claim 3 wherein the resistor has a resistance of between about 230 and about 600 ohms.

5. The apparatus of claim 1 wherein the second electrical component is in series between the first and the second electrical connections of the second pair of electrical connections.

6. The apparatus of claim 1 wherein the second electrical component comprises a resistor.

7. The apparatus of claim 6 wherein the second electrical component comprises a resistor.

8. The apparatus of claim 6 wherein the resistance of the resistor has a resistance of 5 ohms.

9. The apparatus of claim 1 wherein a current through the two-wire process control current loop ranges between about 4 mA and 20 mA.

10. The apparatus of claim 1 wherein a voltage between the second pair of electrical connections ranges between about 20 mVolts and about 100 mVolts.

11. The apparatus of claim 1 including a power supply.

12. The apparatus of claim 11 wherein the power supply provide a DC output of between about 10 V and about 50 V and is coupled in series with the two-wire process control current loop.

13. The apparatus of claim 1 including a output indicative of an active power supply on the two-wire process control current loop.

14. The apparatus of claim 13 wherein the output comprises an optical output.

15. The apparatus of claim 1 wherein the process device includes multiple input channels.

16. The apparatus of claim 1 wherein the first pair of electrical connections is configured for HART® communication.

17. A signal conversion device for use in a process control system, comprising:
a first pair of electrical connections configured to couple to a two-wire process control current loop which includes a two-wire process variable transmitter which provides an analog current level on the two-wire process control current loop related to a sensed process variable;
a second pair of electrical connections configured to couple to an analog voltage input channel of a process device; and
digital communication coupling means electrically coupled between a first electrical connector of the first pair of electrical connections and a first electrical connector of the second pair of electrical connectors for coupling a digital communication signal between a digital communicator and the two-wire process variable transmitter through the first pair of electrical connections;
switch means connected in parallel with the digital communication coupling means between the first electrical connector of the first pair of electrical connections and the first electrical connector of the second pair of electrical connectors for selectively bypassing the digital communication coupling means; and
electrical component means connected between the first and a second electrical connectors of the second pair of electrical connectors for communicating with the voltage input channel of the process device an analog voltage related to the analog current level on the two-wire process control loop.

18. The apparatus of claim 17 wherein the digital communication coupling means comprises a resistor.

19. The apparatus of claim 17 wherein the electrical component means comprises a resistor.

20. A method for use in a process control system, comprising:
providing a process control current loop for coupling to a two-wire process variable transmitter which provides an analog current level on the two-wire process control current loop related to a sensed process variable;
providing a first pair of electrical connections on the two-wire process control current loop for coupling to a digital communicator;
providing a second pair of electrical connections for coupling to an analog voltage input channel of a process device;
providing a first electrical component between a first electrical connector of the first pair of electrical connectors and a first electrical connector of the second pair of electrical connections configured to couple to the digital communicator for digital communication between the digital communicator and the two-wire process variable transmitter;
providing a second electrical component between the first and a second electrical connection of the second pair of electrical connections for communication with the voltage input channel of the process device using an analog voltage related to the analog current level on the tow-wire process control loop;
providing a switch in parallel with the first electrical component between the first electrical connector of the first pair of electrical connectors and the first electrical connections of the second pair of electrical connections;
opening the switch and digitally communicating with the transmitter through the first electrical component; and
closing the switch and bypassing the first electrical component.

21. The method of claim 20 wherein the first electrical component comprises a resistor.

22. The method of claim 20 wherein the second electrical component comprises a resistor.

23. The method of claim 20 wherein the voltage drop across the second pair of electrical connections is between about 20 mVolts and about 100 mVolts.

24. The method of claim 20 wherein a two-wire process control current loop carries an electrical current between about 4 mA and 20 mA.

25. The method of claim 20 including digitally communicating with the two-wire process variable transmitter.

26. The method of claim 25 wherein digital communicating comprises communicating in accordance with the HART® standard.

* * * * *